(12) United States Patent
Borin

(10) Patent No.: US 10,654,365 B2
(45) Date of Patent: May 19, 2020

(54) BIFURCATED BALANCED ELECTROMAGNETIC RESONATOR

(71) Applicant: Aptiv Technologies Limited, St. Michael (BB)

(72) Inventor: Boris Borin, Willoughby Hills, OH (US)

(73) Assignee: Aptiv Technologies Limited (BB)

( * ) Notice: Subject to any disclaimer, the term of this patent is extended or adjusted under 35 U.S.C. 154(b) by 109 days.

(21) Appl. No.: 15/090,834

(22) Filed: Apr. 5, 2016

(65) Prior Publication Data

US 2016/0318407 A1 Nov. 3, 2016

Related U.S. Application Data

(60) Provisional application No. 62/154,188, filed on Apr. 29, 2015.

(51) Int. Cl.
*H02J 50/12* (2016.01)
*B60L 11/18* (2006.01)
*B60L 53/12* (2019.01)
*H02J 7/02* (2016.01)

(52) U.S. Cl.
CPC ............ *B60L 11/185* (2013.01); *B60L 53/12* (2019.02); *H02J 7/025* (2013.01); *H02J 50/12* (2016.02); *Y02B 10/30* (2013.01)

(58) Field of Classification Search
CPC .... B60L 11/18; B60L 11/1809; B60L 11/182; H02J 50/10; H02J 50/12; H02J 7/02; H02J 7/022; H02J 7/025

USPC .......................................... 307/104; 320/108
See application file for complete search history.

(56) References Cited

U.S. PATENT DOCUMENTS

| | | | |
|---|---|---|---|
| 5,995,064 A | 11/1999 | Yanagisawa et al. | |
| 6,118,411 A | 9/2000 | Hasegawa et al. | |
| 9,634,610 B2 * | 4/2017 | Babaie | H01F 27/2823 |
| 2002/0101383 A1 | 8/2002 | Junod | |
| 2005/0110700 A1 | 5/2005 | Terry | |
| 2012/0267960 A1 | 10/2012 | Low et al. | |
| 2014/0300202 A1 * | 10/2014 | Shimokawa | B60L 11/182 307/104 |
| 2015/0051750 A1 | 2/2015 | Kurs et al. | |
| 2016/0261142 A1 * | 9/2016 | Park | H02J 50/40 |
| 2016/0350638 A1 * | 12/2016 | Kato | G06K 19/07722 |
| 2017/0149394 A1 * | 5/2017 | Kao | H03F 3/19 |

* cited by examiner

*Primary Examiner* — Lincoln D Donovan
*Assistant Examiner* — Diana J. Cheng
(74) *Attorney, Agent, or Firm* — Robert J. Myers

(57) ABSTRACT

A bifurcated electromagnetic resonator split into two separate coils, a first coil and a second coil. The inductance value of the first coil is substantially equal to the inductance value of the second coil. A matching network comprising passive electronic components, such as capacitors and inductors, is in series with and intermediate to the first coil and the second coil. This results in a resonator having a balanced circuit topology. The bifurcated resonator may be used as a source and/or capture resonator in a wireless power transfer system.

20 Claims, 6 Drawing Sheets

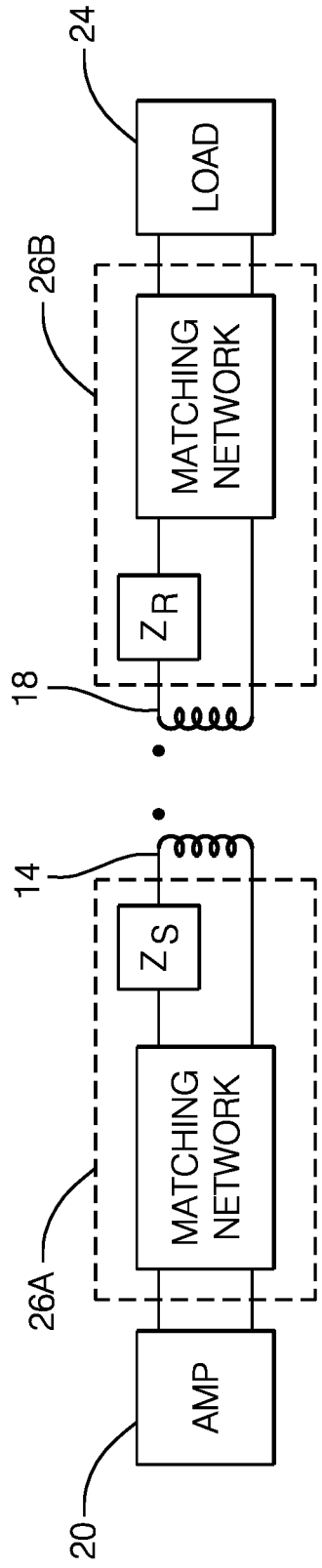
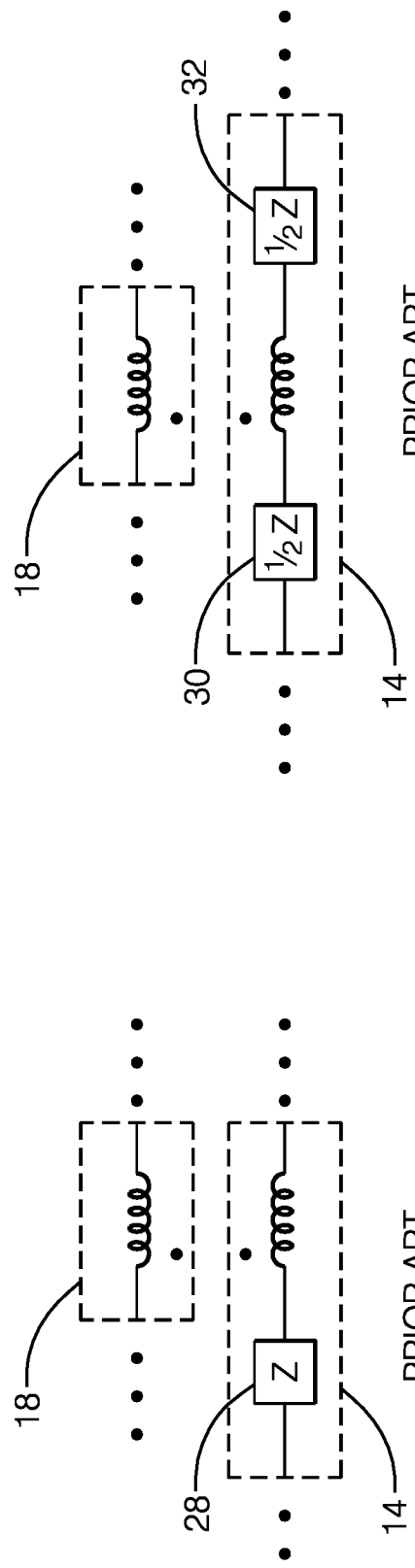
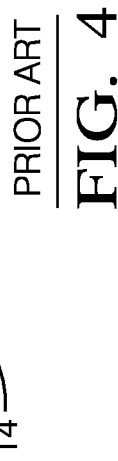

BIFURCATED BALANCED ELECTROMAGNETIC RESONATOR

CROSS-REFERENCE TO RELATED APPLICATION

This application claims the benefit under 35 U.S.C. § 119(e) of U.S. Provisional Patent Application No. 62/154,188, filed on Apr. 29, 2015, the entire disclosure of which is hereby incorporated by reference.

TECHNICAL FIELD OF THE INVENTION

The invention relates to an electromagnetic resonator, such as a source resonator or capture resonator for a wireless power transfer systems, particularly to an electromagnetic resonator that is bifurcated and balanced regarding an impedance matching network.

BACKGROUND OF THE INVENTION

Electric vehicles and electric-hybrid vehicles are gaining in popularity with consumers. The electric motors in these vehicles are typically powered from multiple storage batteries disposed in a battery pack in the vehicle. If the battery pack needs to be recharged while the vehicle is parked, a wired coupling device is connected to the vehicle, typically by the vehicle operator. However, some operators object to having to 'plug-in' their vehicle each time the vehicle needs to be charged. Portable personal electronics, such as cellular telephones and tablet computers, are also powered by batteries that need to be recharged. Owners of these products also have similar objections to plugging in the device when charging is required.

Wireless or connector-less power transfer systems have been proposed. An example of a wireless power transfer system 10 for an electric or hybrid electric vehicle 12 is shown in FIG. 1A and includes a source resonator 14 lying on a parking surface 16 under the vehicle 12 being charged, and a corresponding capture resonator 18 mounted on the underside of the vehicle 12. The source resonator 14 is connected to an alternating electrical power supply 20 that generates a magnetic field 22 that wirelessly induces an electric current in the capture resonator 18 that is rectified and supplied to a battery pack 24 in the vehicle. Other applications of this technology may be used for lower power charging, such as charging portable personal electronics. As shown in FIG. 1B, the portable electronic device 25 includes a capture resonator (not shown) that is placed in a magnetic field (not shown) generated by a source resonator (not shown) contained within a charging mat 27 embedded in the central console 29 of a vehicle when the electronic device 25 is placed on or near the charging mat 27.

To achieve desired impedance matching of the source resonator 14 and the capture resonator 18, a matching network of passive electrical components (resistors, inductors, capacitors) is used. FIG. 2 an example of a matching network 26A and 26B that includes reactive components (inductors, capacitors) in any series/shunt topology and an impedance (hereinafter referred to as a "series Z") connected in series to either the source resonator, the capture resonator or both. The series Z of matching network 26A, 26B or both, may be configured as a combination of reactive components to achieve a desired electrical impedance (hereinafter referred to as a "bank"). As illustrated in FIG. 3, the series Z can be implemented as a single bank 28 of components connected in series with one or the other terminal of the source resonator 14 or the capture resonator 18. Alternatively, as shown in FIGS. 4 and 5, the series Z may be configured as two banks 30, 32 of components, one bank connected in series with each terminal of the source resonator or the capture resonator. The sum of the impedance of both banks 30, 32 is equal to Z, e.g. the impedance of each bank may be Z/2. It is understood that for higher frequencies (typically greater than 10 MHz), but in many cases much lower, parasitic properties of the components in each bank and the resonator itself will require adjusting the value of components in each bank of FIG. 3. and FIG. 4. typically by as much as ±10% (hereinafter referred to as "tuning").

A single bank 28 implementation of series Z matching network 26 provides low cost and relatively easy tuning process, but produces an unbalanced circuit topology, thus increasing common mode noise and electromagnetic interference (EMI) in the system 10. This may require the use of more expensive components elsewhere in the system 10 in order to suppress the common mode noise and/or additional filtration to reduce EMI.

A two bank 30, 32 implementation of series Z matching network 26 produces a balanced circuit topology that provides reduced common mode noise and EMI compared to an equivalent single bank 28 series Z matching network 26. However, using two banks requires at least doubling the number of components used to construct the two banks 30.32 compared to the single bank 28 matching network implementation of series Z, thus increasing component cost. The two bank matching network also increases process cost due to additional tuning complexity and an additional assembly step.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches to solving a problem, which in and of themselves may also be inventions.

BRIEF SUMMARY OF THE INVENTION

In accordance with an embodiment of the invention, a bifurcated electromagnetic resonator is provided. The bifurcated electromagnetic resonator includes a first coil, a second coil, and a matching network formed of passive electronic components. The matching network is in series with and is intermediate to the first coil and the second coil and may be connected directly, or through additional reactive and/or reactive components, to an amplifier, inverter or load. A first inductance value of the first coil is substantially equal to a second inductance value of the second coil. According to one embodiment the matching network consists solely of reactive electronic components. According to another embodiment, the matching network consists solely of capacitive components. According to yet another embodiment, the matching network consists of both reactive and resistive components. An alternating electric current received by the bifurcated electromagnetic resonator may generate an alternating magnetic field or an alternating magnetic field received by the bifurcated electromagnetic resonator may generate an alternating electric current.

In accordance with another embodiment, a wireless power transfer system having a source resonator configured to receive an alternating electric current and generate an alternating magnetic field and having a capture resonator configured to receive the alternating magnetic field and generate another alternating electric current is provided. The source resonator and/or the capture resonator incorporates a bifurcated electromagnetic resonator as described supra in the Brief Summary Of The Invention.

BRIEF DESCRIPTION OF THE SEVERAL VIEWS OF THE DRAWING

The present invention will now be described, by way of example with reference to the accompanying drawings, in which:

FIG. 2 is schematic diagram of wireless power transfer system having a pair of resonators each including a matching network according to the prior art;

FIG. 3 is isolated schematic diagram of wireless power transfer system having a pair of resonators, one of which including an unbalanced matching network having a single bank of components according to the prior art;

FIG. 4 is isolated schematic diagram of wireless power transfer system having a pair of resonators, one of which including a balanced matching network having two banks of components according to the prior art;

DETAILED DESCRIPTION OF THE INVENTION

Presented herein is a wireless power transfer system having a source resonator and/or a capture resonator that includes a bifurcated, or split, resonator.

The coil of the resonator is to split in to two parts and the matching network is placed in series intermediate to, i.e. between, the two coils in order to achieve a balanced circuit topology that reduces common mode noise and EMI, without the need of additional components.

Figure 6:
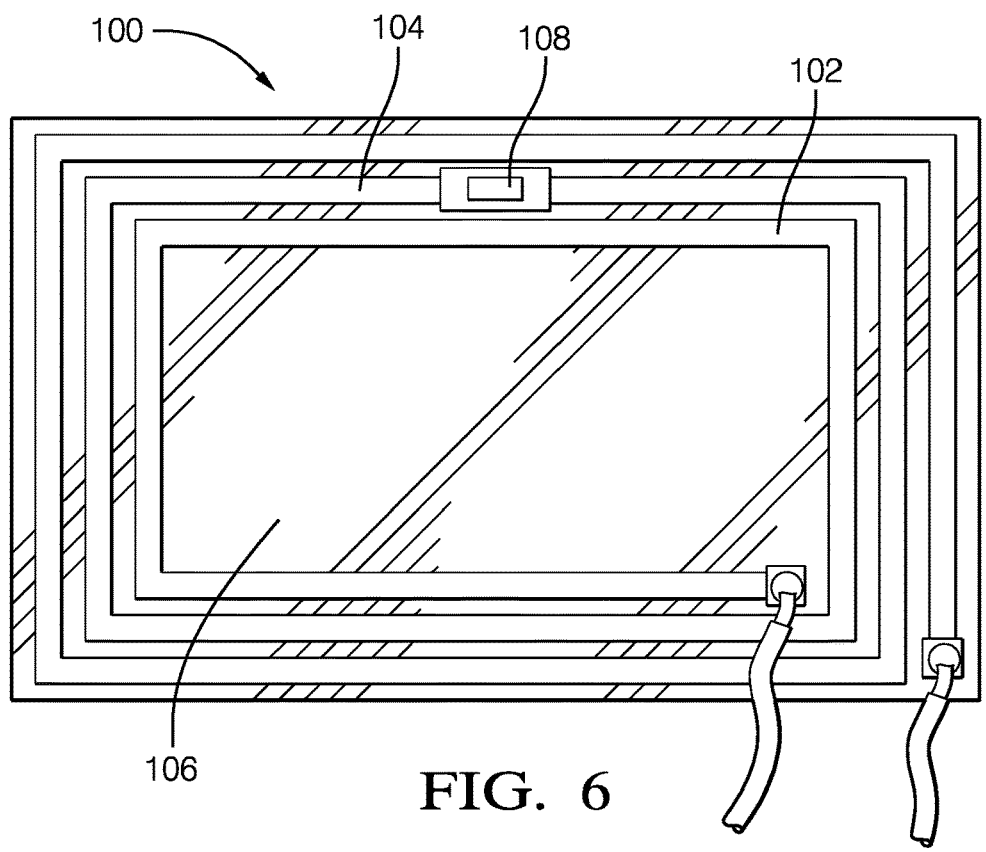
FIG. 6 is top view of a bifurcated resonator on a printed circuit board in accordance with one embodiment.

A non-limiting example of such a bifurcated resonator 100 is shown in FIG. 6. The first and second coils 102, 104 are formed by circuit traces on a printed circuit board (PCB) 106. Alternatively, the bifurcated resonator 100 may be formed of Litz wire, magnet wire, foil, or any other type of coil winding material, and may use any suitable coil geometry, e.g. toroidal or solenoidal. The inductance value of the first coil 102 may be substantially equal to the inductance value of the second coil 104. As used herein, substantially equal means that the inductance value of the first coil 102 is within ±10% of the inductance value of the second coil 104.

Figure 7:
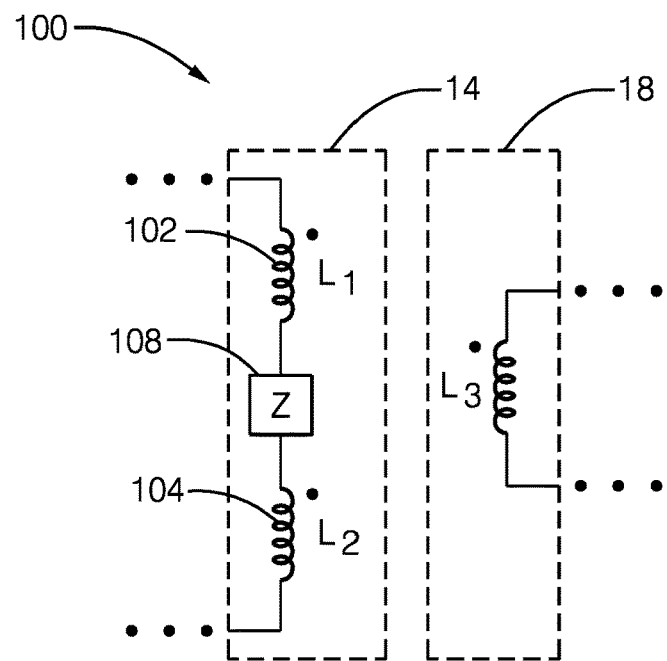
FIG. 7 is isolated schematic diagram of wireless power transfer system having a pair of resonators, one is a bifurcated resonator in accordance with one embodiment.

The matching network 108 is preferably formed of reactive components, such as inductors and capacitors, although non-reactive components, such as resistors, may also be required to achieve desired impedance matching between the source resonator 14 and the capture resonator 18. The matching network 108, in this example a pair of series capacitors, is connected in series to the first and second coil 102, 104 so that the matching network 108 is located intermediate to, i.e. between, the first and second coil 102, 104, thus providing a balanced circuit topology as shown in FIG. 7. As can be seen in FIGS. 6 and 7, neither of the terminals of the matching network 108 are connected directly to ground.

Figure 1A:
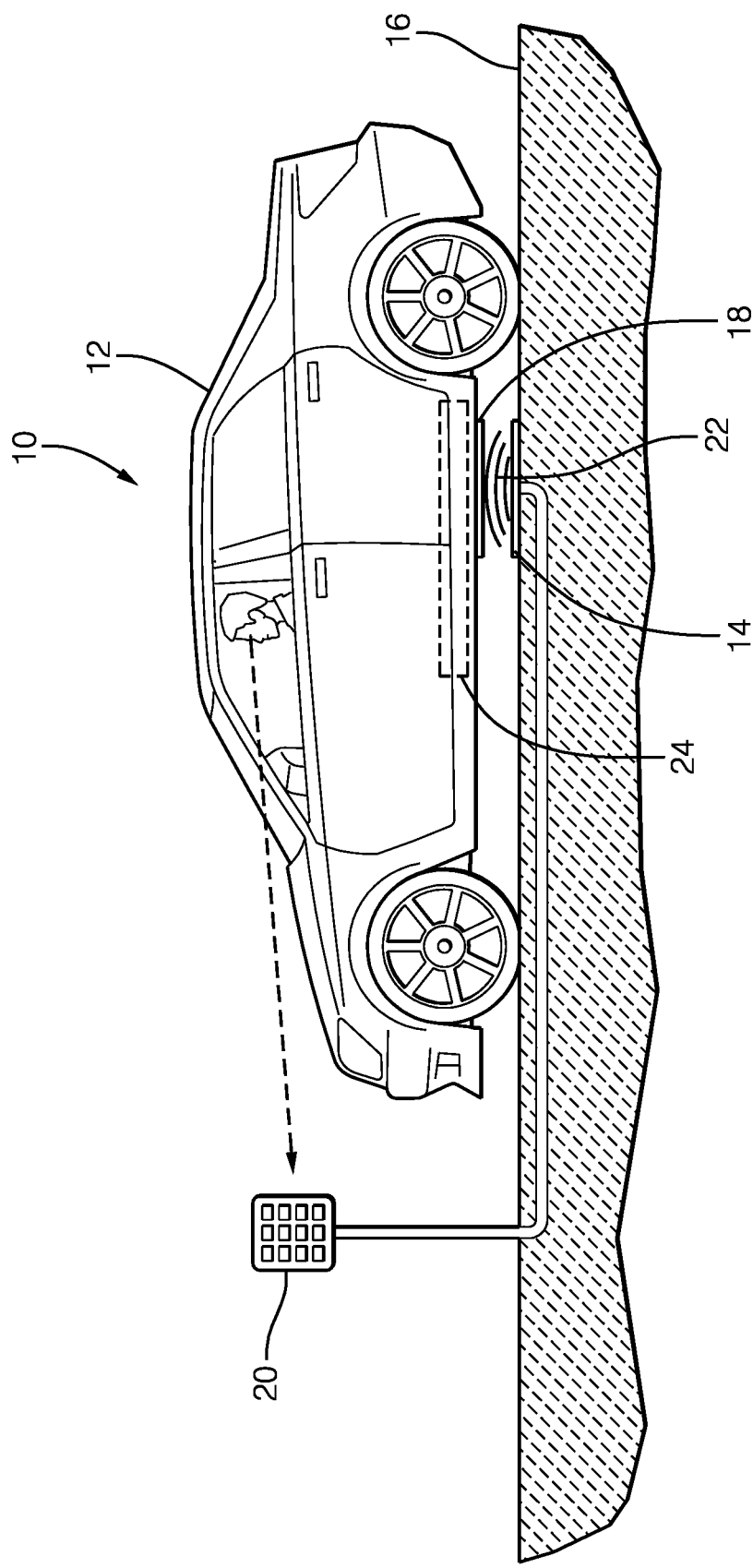
FIG. 1A is a side view of a wireless power transfer system for a vehicle including a source resonator and a capture resonator in accordance with one embodiment.
Figure 1B:
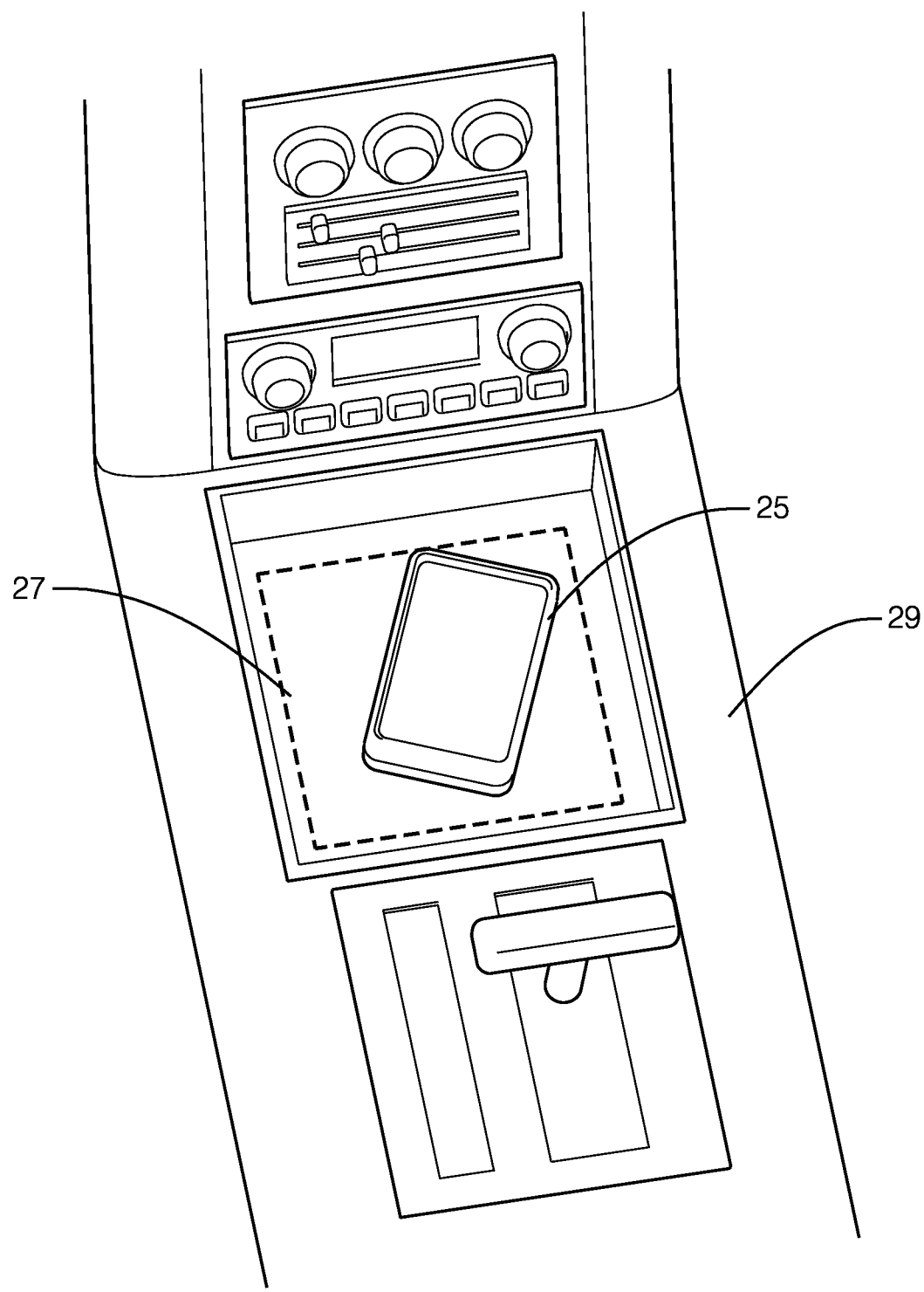
FIG. 1B is a perspective view view of a wireless power transfer system for a portable electronic device including a source resonator and a capture resonator in accordance with one embodiment.
Figure 5:
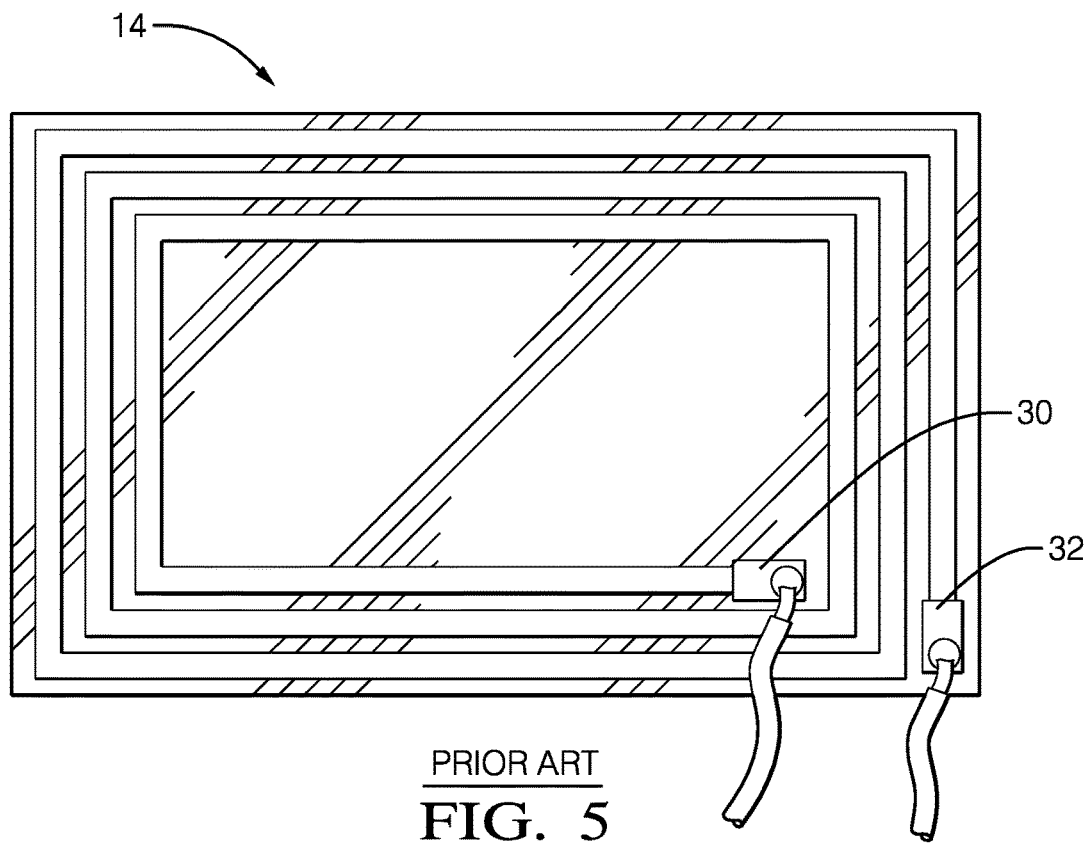
FIG. 5 is top view of a resonator on a printed circuit board including the balanced matching network shown in FIG. 4 according to the prior art.

As illustrated in FIG. 7, the bifurcated resonator 100 shown in FIG. 7 is used as a source resonator 14 and/or a capture resonator 18 in a wireless power transfer system 10 configured to wirelessly provide power to charge a battery pack 24 in an electric or hybrid electric vehicle 12 in a system 10 as shown in FIG. 1A or a portable electronic device 25 as shown in FIG. 1B. An alternating current power supply 20 connected to the source resonator 14 causes the source resonator 14 to generate an alternating magnetic field 22. The capture resonator 18 is positioned within the alternating magnetic field 22 such that the alternating magnetic field 22 generates an alternating electrical current in the capture resonator 18. Alternating electrical current is typically rectified to a direct current and passed to a battery pack 24 in the electric vehicle 12 to recharge the batteries in the battery pack 24. The bifurcated resonator 100 may additionally or alternatively be used as the capture resonator 18 of the wireless power transfer system 10.

Figure 8:
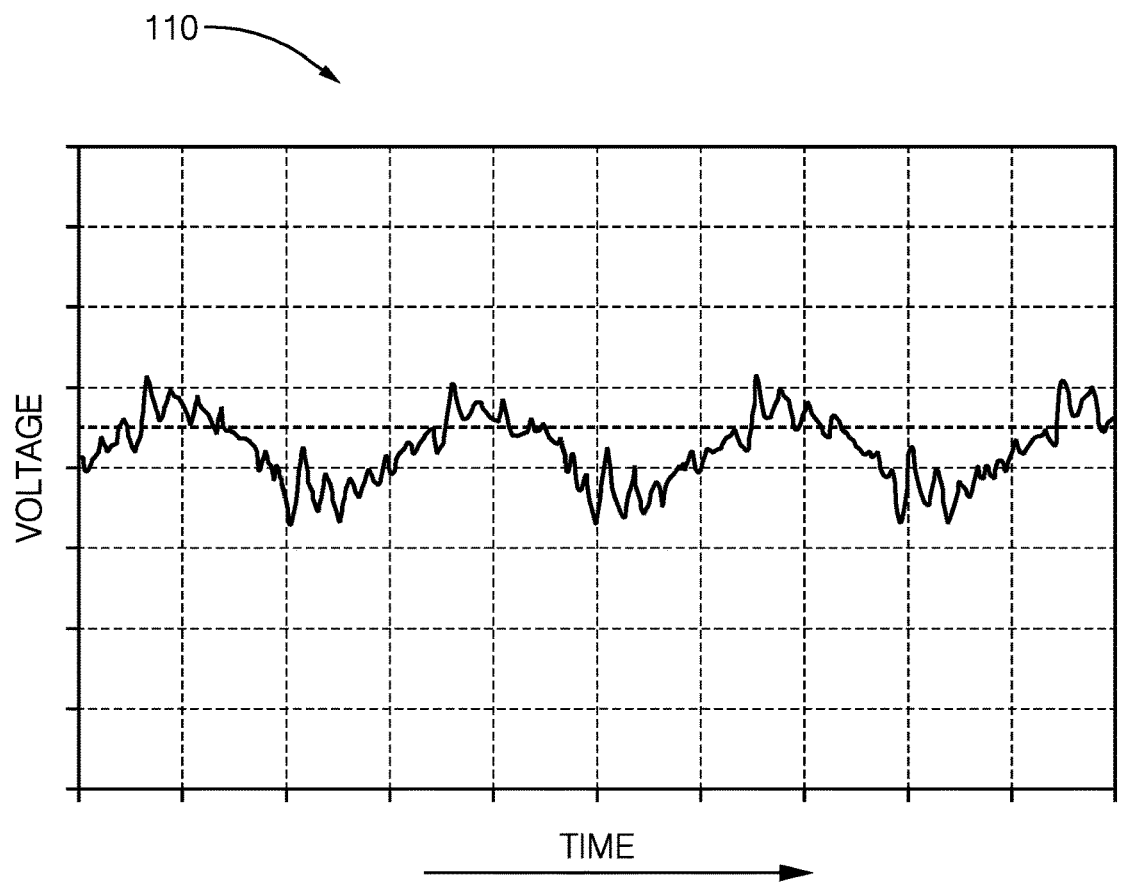
FIG. 8 is plot of common mode noise of the circuit according to the schematic diagram of FIG. 3.
Figure 9:
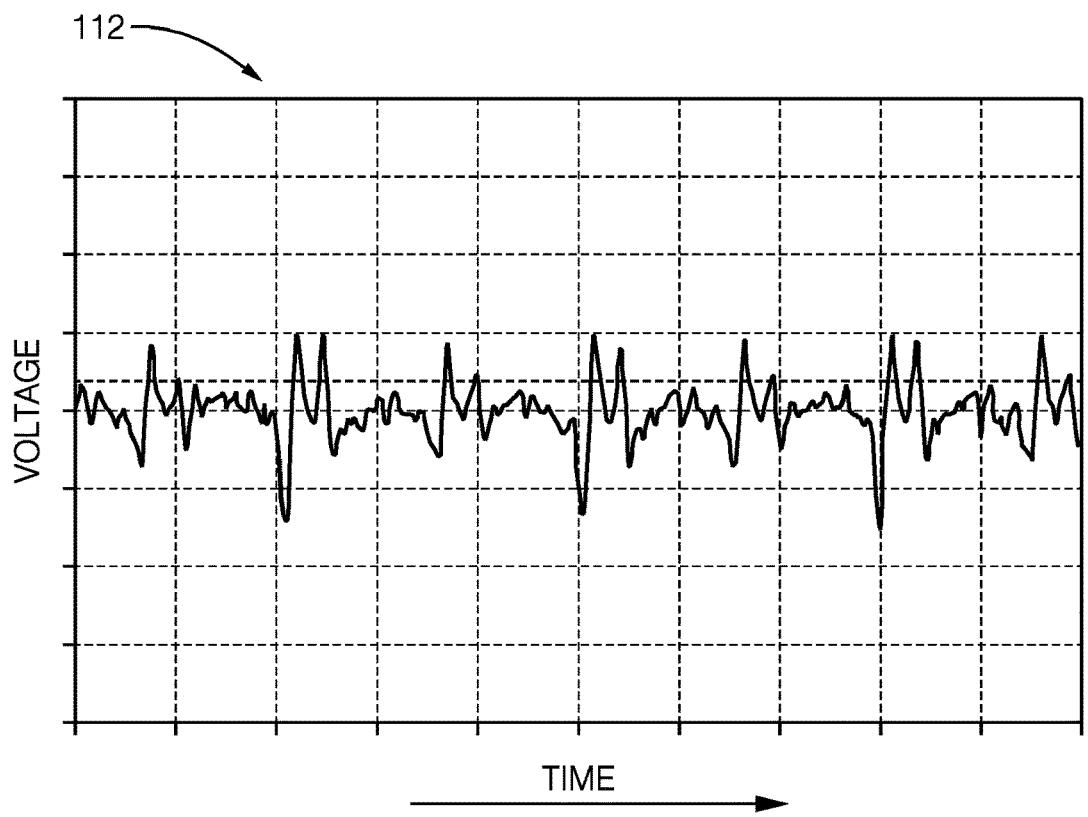
FIG. 9 is plot of common mode noise of the circuit according to the schematic diagram of FIG. 4.
Figure 10:
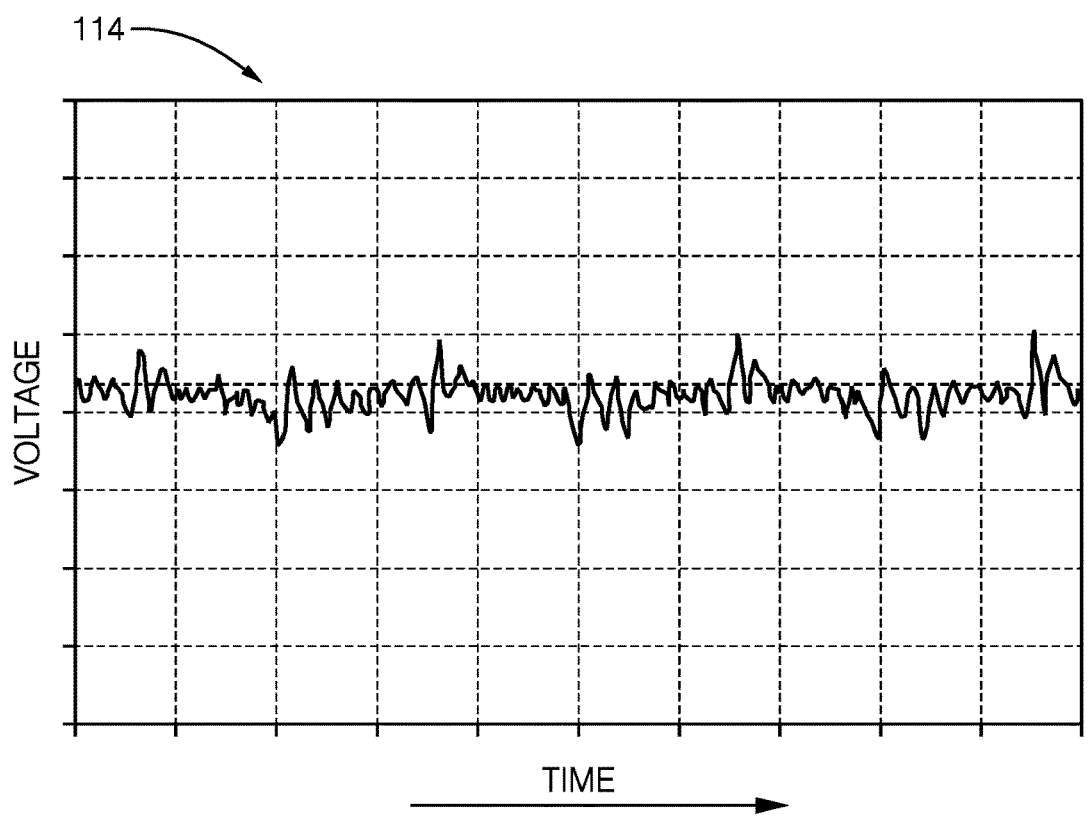
FIG. 10 is plot of common mode noise of the circuit according to the schematic diagram of FIG. 7.

FIG. 8 illustrates a graph 110 of the common mode noise generated by an unbalanced matched resonator according to FIG. 3. FIG. 9 illustrates a graph 112 of the common mode noise generated by a balanced resonator according to FIG. 4. FIG. 10 illustrates a graph 114 of the common mode noise generated by the bifurcated resonator 100 of FIG. 7. Each of the resonators have the same component values and each are operated using the same input voltage. As can be seen by comparing the graphs 110, 112, 114, the common mode noise generated by the bifurcated resonator 100 is comparable to that generated by the balanced resonator of FIG. 4 and is less than the common mode noise generated by the unbalanced resonator of FIG. 3.

While the examples above have referred to the use of a bifurcated resonator 100 in a wireless power transfer system 10 for an electric vehicle 12 or portable electronic device 25, the bifurcated resonator 100 described herein may be applied to any other application for wireless power transfer, such as for industrial uses (e.g. hazardous locations, wind turbines) or home uses (e.g. appliances, TV, computer, furniture, lighting). The bifurcated resonator 100 described herein may also be applied to electromagnetic signal transmission, e.g. near field communication (NFC).

Accordingly a bifurcated electromagnetic resonator 100 and a wireless power transfer system 10 including the same is provided. The bifurcated resonator 100 provides a balanced resonator topology using a single bank matching network 108 by splitting the bifurcated resonator 100 into two separate coils 102, 104. The bifurcated resonator 100 may be formed of Litz wire, magnet wire, foil or printed circuit board (PCB) traces or any other material suitable for an electromagnetic resonator. The bifurcated resonator 100 provides lower common mode noise and EMI in the system 10 without the added components and processing costs associated with prior art devices.

While this invention has been described in terms of the preferred embodiments thereof, it is not intended to be so limited, but rather only to the extent set forth in the claims that follow. Moreover, the use of the terms first, second, etc. does not denote any order of importance, but rather the terms first, second, etc. are used to distinguish one element from another. Furthermore, the use of the terms a, an, etc. do not denote a limitation of quantity, but rather denote the presence of at least one of the referenced items.

I claim:

1. A bifurcated electromagnetic resonator, comprising:
a first coil;
a second coil, wherein the first coil is disposed within and surrounded by the second coil and wherein the first coil is connected in series and is co-planar with the second coil; and
a matching network comprising passive electronic components, wherein said matching network is connected in series with and intermediate to the first coil and the second coil and wherein a first inductance value of the first coil is substantially equal to a second inductance value of the second coil.

2. The bifurcated electromagnetic resonator according to claim 1, wherein the matching network consists of reactive electronic components.

3. The bifurcated electromagnetic resonator according to claim 2, wherein the matching network consists of capacitive components.

4. The bifurcated electromagnetic resonator according to claim 1, wherein an alternating electric current received by the bifurcated electromagnetic resonator generates an alternating magnetic field.

5. The bifurcated electromagnetic resonator according to claim 1, wherein an alternating magnetic field received by the bifurcated electromagnetic resonator generates an alternating electric current.

6. The bifurcated electromagnetic resonator according to claim 1, wherein the first and second coils are formed by circuit traces on a printed circuit board.

7. The bifurcated electromagnetic resonator according to claim 1, wherein the matching network is not connected directly to ground.

8. A wireless power transfer system having a bifurcated source resonator configured to receive an alternating electric current and generate an alternating magnetic field and having a capture resonator configured to receive the alternating magnetic field and generate another alternating electric current, said bifurcated source resonator comprising:
a first coil;
a second coil, wherein the first coil is disposed within and surrounded by the second coil and wherein the first coil is connected in series and is co-planar with the second coil; and
a matching network comprising passive electronic components, wherein said matching network is connected in series with and intermediate to the first coil and the second coil and wherein a first inductance value of the first coil is substantially equal to a second inductance value of the second coil.

9. The wireless power transfer system according to claim 6, wherein the matching network consists of reactive electronic components.

10. The wireless power transfer system according to claim 6, wherein the matching network consists of capacitive components.

11. The wireless power transfer system according to claim 6, wherein the first and second coils are formed by circuit traces on a printed circuit board.

12. The wireless power transfer system according to claim 6, wherein the matching network is not connected directly to ground.

13. A wireless power transfer system having a source resonator configured to receive an alternating electric current and generate an alternating magnetic field and having a bifurcated capture resonator configured to receive the alternating magnetic field and generate another alternating electric current, said bifurcated capture resonator comprising:
a first coil;
a second coil, wherein the first coil is disposed within and surrounded by the second coil and wherein the first coil is connected in series and is co-planar with the second coil; and
a matching network comprising passive electronic components, wherein said matching network is connected in series with and intermediate to the first coil and the second coil and wherein a first inductance value of the first coil is substantially equal to a second inductance value of the second coil.

14. The wireless power transfer system according to claim 11, wherein the matching network consists of reactive electronic components.

15. The wireless power transfer system according to claim 12, wherein the matching network consists of capacitive components.

16. The wireless power transfer system according to claim 11, wherein the first and second coils are formed by circuit traces on a printed circuit board.

17. The wireless power transfer system according to claim 11, wherein the matching network is not connected directly to ground.

18. The bifurcated electromagnetic resonator according to claim 6, wherein the first and second coils are planar coils formed by the circuit traces on the printed circuit board.

19. The wireless power transfer system according to claim 11, wherein the first and second coils are planar coils formed by the circuit traces on the printed circuit board.

20. The wireless power transfer system according to claim 16, wherein the first and second coils are planar coils formed by the circuit traces on the printed circuit board.

* * * * *